United States Patent [19]

Nishii

[11] Patent Number: 4,859,004

[45] Date of Patent: Aug. 22, 1989

[54] HYDRAULIC BRAKING SYSTEM FOR AN AUTOMOTIVE VEHICLE

[75] Inventor: Michiharu Nishii, Toyota, Japan

[73] Assignee: Aisin Seiki Kabushiki Kaisha, Kariya, Japan

[21] Appl. No.: 174,859

[22] Filed: Mar. 29, 1988

[30] Foreign Application Priority Data

Mar. 31, 1987 [JP] Japan .................................. 62-80179

[51] Int. Cl.$^4$ ............................................... B60F 8/02
[52] U.S. Cl. ..................... 303/119; 303/113; 303/114
[58] Field of Search ............. 303/113, 114, 115, 116, 303/117, 119; 60/547.1, 555, 556, 561, 581, 591

[56] References Cited

U.S. PATENT DOCUMENTS

| | | | |
|---|---|---|---|
| 3,431,028 | 3/1969 | Yoder | 188/349 |
| 3,521,934 | 7/1970 | Leiber | 303/119 |
| 3,659,905 | 5/1972 | Goulish | 303/114 |
| 3,753,600 | 8/1973 | Gemmellaro | 303/119 |
| 3,877,756 | 4/1975 | Inada et al. | 303/114 |
| 3,905,655 | 10/1975 | de Gennes | 303/119 |
| 4,129,341 | 12/1978 | Pauwels | 303/115 X |
| 4,415,210 | 11/1983 | Belart et al. | 303/116 |
| 4,453,782 | 6/1984 | Arikawa et al. | 303/116 |
| 4,492,414 | 1/1985 | Kozakai et al. | 303/115 X |
| 4,552,413 | 11/1985 | Fujii et al. | 303/106 |
| 4,565,411 | 1/1986 | Seiber | 303/116 |
| 4,578,951 | 4/1986 | Belart et al. | 303/119 X |
| 4,597,611 | 7/1986 | Nishimura et al. | 303/116 |
| 4,602,824 | 7/1986 | Nishimura et al. | 303/100 |
| 4,605,263 | 8/1986 | Ando et al. | 303/116 |
| 4,618,189 | 10/1986 | Nakanishi et al. | 303/116 |
| 4,620,750 | 11/1986 | Leiber | 60/591 |
| 4,624,508 | 11/1986 | Adachi et al. | 303/115 |
| 4,636,008 | 1/1987 | Adachi et al. | 303/92 |
| 4,636,010 | 1/1987 | Adachi et al. | 303/114 |
| 4,641,805 | 6/1987 | Leiber | 303/114 |
| 4,641,895 | 2/1987 | Belart et al. | 60/547.1 |
| 4,652,061 | 3/1987 | Nishimura et al. | 303/116 |
| 4,655,509 | 4/1987 | Ando et al. | 303/10 |
| 4,660,899 | 4/1987 | Ando et al. | 303/115 |
| 4,674,805 | 6/1987 | Leiber | 303/114 |
| 4,678,243 | 7/1987 | Leiber | 303/114 |
| 4,685,747 | 8/1987 | Belart et al. | 303/114 |
| 4,715,666 | 12/1987 | Farr | 303/117 X |
| 4,730,879 | 3/1988 | Adachi et al. | 303/116 |
| 4,750,788 | 6/1988 | Seibert et al. | 303/119 X |
| 4,754,605 | 7/1988 | Seibert et al. | 60/591 |

FOREIGN PATENT DOCUMENTS

| | | |
|---|---|---|
| 2363619 | 4/1974 | Fed. Rep. of Germany . |
| 2519835 | 3/1976 | Fed. Rep. of Germany . |
| 2444765 | 4/1976 | Fed. Rep. of Germany ...... 303/116 |
| 3420687 | 12/1985 | Fed. Rep. of Germany ..... 60/547.1 |
| 0028944 | 8/1971 | Japan ................................. 137/514.5 |
| 49-28307 | 8/1974 | Japan . |
| 56-10219 | 3/1981 | Japan . |
| 56-142733 | 5/1981 | Japan . |
| 57-172863 | 10/1982 | Japan . |
| 58-199258 | 11/1983 | Japan . |
| 59-227552 | 12/1984 | Japan . |
| 60-25834 | 1/1985 | Japan . |
| 60-25835 | 1/1985 | Japan . |
| 0071359 | 4/1985 | Japan ................................. 303/116 |
| 4565411 | 1/1986 | Japan ................................. 303/116 |
| 62-187638 | 9/1987 | Japan . |
| 2056606 | 3/1980 | United Kingdom ................ 303/116 |
| 2141195A | 12/1984 | United Kingdom . |
| 2168771A | 6/1986 | United Kingdom . |
| 2175362A | 6/1986 | United Kingdom . |

Primary Examiner—Andres Kashnikow
Assistant Examiner—M. C. Graham
Attorney, Agent, or Firm—Burns, Doane, Swecker & Mathis

[57] ABSTRACT

A hydraulic braking system for an automotive vehicle having a hydraulic braking pressure generator arranged to control the communication of a pressure chamber defined therein with a power source and a reservoir in response to depression of a brake pedal. The power chamber is normally communicated with the reservoir through a drain passage when the brake pedal is not depressed. Between the pressure generator and wheel brake cylinders disposed is valve means for controlling the communication of the wheel brake cylinders with the pressure generator and the reservoir. A changeover valve is arranged to normally communicate the power chamber with the reservoir and communicate the power chamber with the power source through the drain passage blocking its communication with the reservoir in a slip condition of driven wheels. In accelerating operation the changeover valve and the valve means are operated depending on the slip condition of the driven wheels to brake the same effectively preventing the slip. The system provides anti-locking operation as well.

6 Claims, 1 Drawing Sheet

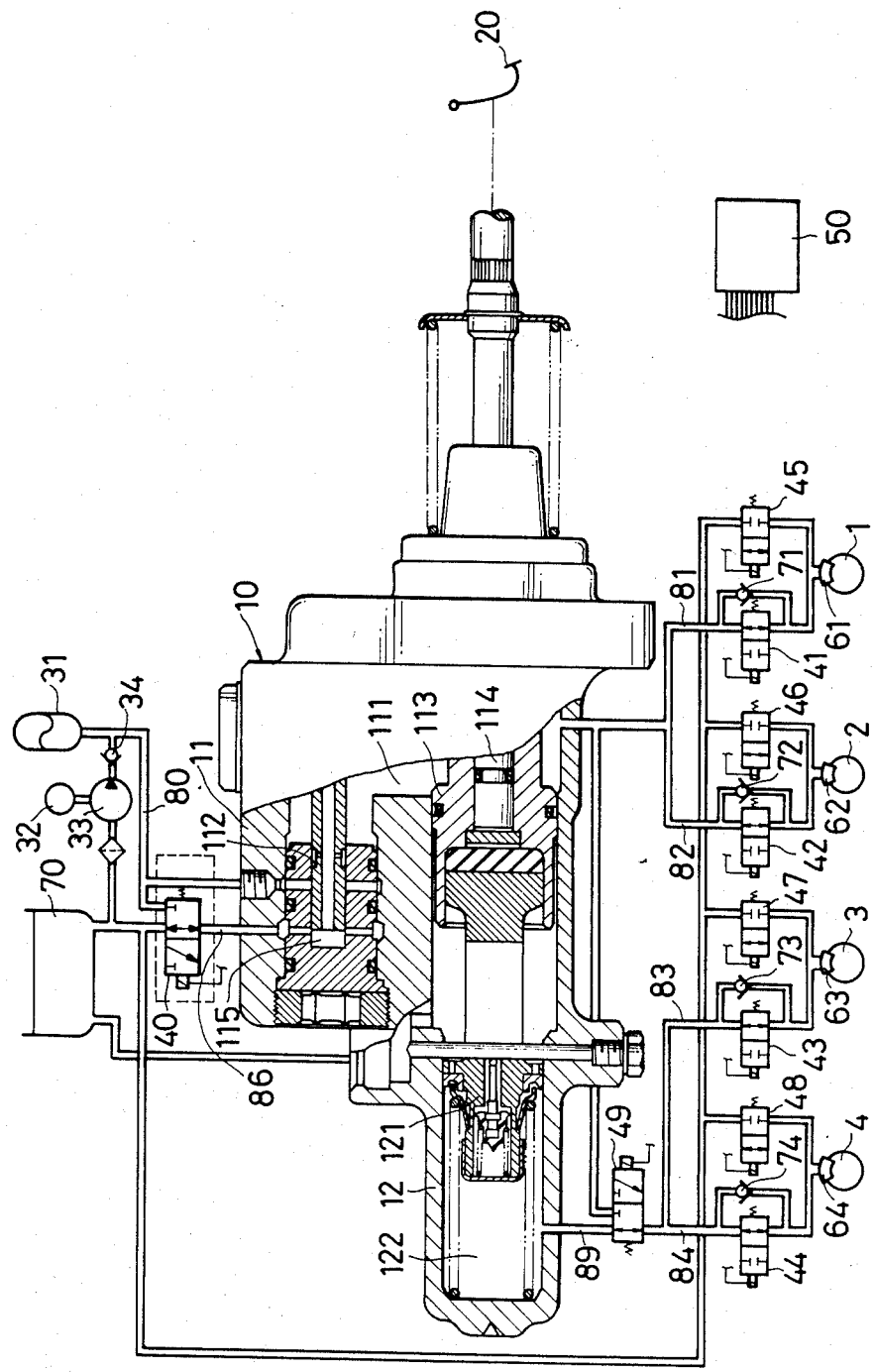

HYDRAULIC BRAKING SYSTEM FOR AN AUTOMOTIVE VEHICLE

BACKGROUND OF THE INVENTION

1. Field of the Invention

The present invention relates to a hydraulic braking system for use in an automotive vehicle, and more particularly to a hydraulic braking system which comprises a hydraulic braking pressure generator having a power chamber communicated with a power source, a plurality of wheel brake cylinders connected to the hydraulic braking pressure generator and to a reservoir, and valve means for controlling the communication between the hydraulic pressure generator and the wheel brake cylinders and the communication between the reservoir and the wheel brake cylinders.

2. Description of the Prior Art

The apparatus with the valve means described above is known as so called anti-skid apparatus which prevents the road wheels from locking in braking operation.

In accelerating operation, it is necessary to prevent a slip on driven wheels of the road wheels, for providing an optimum accelerating performance. For this purpose, a connecting valve is disposed in a hydraulic passage connecting the hydraulic braking pressure generator to the wheel brake cylinders provided on the driven wheels, at a position upstream of the above-described valve means disposed in the hydraulic passage, as disclosed in U.S. Pat. No. 4,565,411.

According to the hydraulic brake system described above, the road wheels are prevented from locking in braking operation by suitably controlling the hydraulic braking pressure applied to the wheel brake cylinders by means of the valve means, and the slip of the driven wheels is prevented in starting or accelerating operation by means of the valve means and the connecting valve which normally interrupts the flow between the wheel cylinders of the driven wheels and a pressure accumulator, i.e. the power source. In the above-described hydraulic brake system, a single connecting valve may be disposed in a passage connecting the hydraulic braking pressure generator to the wheel brake cylinders of the driven wheels.

However, in the case where a diagonal dual circuit is employed, in which a first passage connects the hydraulic braking pressure generator to one of the wheel brake cylinders of the driven wheels and one of the wheel brake cylinders of the free wheels, and a second passage connects the same to the rest of the wheel brake cylinders, the connecting valve must be disposed in each of the first and second passages, as in the case where all the road wheels are the driven wheels. In these cases, therefore, at least two sets of the connecting valve are needed to be disposed and corresponding arrangement of passages is necessary, so that the braking system as a whole becomes costly, large and heavy.

SUMMARY OF THE INVENTION

It is, therefore, an object of the present invention to provide a hydraulic braking system for an automotive vehicle which effectively prevents the road wheels from locking in braking operation and also prevents the slip of the driven wheels in accelerating operation, and wherein the system is relatively small in size, light in weight and economical to manufacture.

It is another object of the present invention to provide a hydraulic braking system which functions as described above and which may be applied to a vehicle with a diagonal dual circuit without any substantial change to the hydraulic braking system with a front-rear dual circuit.

It is further object of the present invention to provide a hydraulic braking system with a single changeover valve arranged therein, which is commonly applied to all the vehicles irrespective of their drive system such as a front-drive, a rear-drive or all wheels-drive system.

In accomplishing these and other objects, a hydraulic braking system for an automotive vehicle according to the present invention comprises:

(a) a power source which produces a hydraulic power pressure;

(b) a reservoir which stores an amount of hydraulic fluid;

(c) a hydraulic braking pressure generator which has a housing defining therein a power chamber communicated with the power source through a power passage and communicated with the reservoir through a drain passage, and which is arranged to control the communication of the power chamber with the power source and the reservoir, which is normally communicated with the power chamber through the drain passage when a brake pedal is in an initial position thereof, in response to depression of the brake pedal to generate a hydraulic pressure in the power chamber.;

(d) a changeover valve which is selectively placed in one of a first operating position for communicating the power chamber with the reservoir through the drain passage, and a second operating position for communicating the power chamber with the power source through the drain passage and blocking the communication between the power chamber and the reservoir;

(e) a plurality of wheel brake cylinders for braking respective road wheels, which are connected to the hydraulic braking pressure generator to be applied with a hydraulic pressure corresponding to the hydraulic pressure in the power chamber, and which are connected to the reservoir; and (f) valve means for controlling the communication between the hydraulic braking pressure generator and the wheel brake cylinders, and the communication between the reservoir and the wheel brake cylinders.

In the hydraulic braking system according to the present invention, with the power chamber of the hydraulic braking pressure generator communicated with the power source by placing the changeover valve in its second operating position when the brake pedal is not depressed, the hydraulic power pressure is supplied from the power source to the power chamber, thus rendering the hydraulic braking pressure generator operative, and a hydraulic pressure corresponding to the hydraulic power pressure is applied from the hydraulic braking pressure generator to all the wheel brake cylinders. With the power chamber of the hydraulic braking pressure generator communicated with the reservoir by placing the changeover valve in its first operating position when the brake pedal is not depressed, the hydraulic braking pressure generator is held inoperative, so that no hydraulic pressure is applied to any of the wheel brake cylinders. Further, with the power chamber of the hydraulic braking pressure generator communicated with the reservoir by placing the changeover valve in its first operating position when the brake pedal is depressed, the hydraulic braking pressure generator generates a hydraulic pressure in response to depression of the brake pedal and applies to all the wheel brake cylinders.

Thus, with the changeover valve held in its first operating position, when the road wheels are braked by the hydraulic pressure applied from the hydraulic braking pressure generator to each wheel brake cylinder in response to depression of the brake pedal, the valve means is operated depending on locking condition of the road wheels. Accordingly, the hydraulic pressure in each wheel brake cylinder is increased or decreased to prevent the road wheels from locking in braking operation (i.e., provide the anti-locking operation).

With the changeover valve held in its second operating position and with the valve means suitably operated depending on the condition of the slip of the driven wheels occurred in starting or accelerating operation, only the driven wheels in the slip condition are braked without depression of the brake pedal in such a manner that the driven force is not impeded, therby to effectively prevent the slip (i.e., provide the anti-slip operation).

BRIEF DESCRIPTION OF THE DRAWING

The above stated objects and following description will become readily apparent with reference to the accompanying drawing, which is a schematic illustration of a hydraulic braking system according to a preferred embodiment of the present invention.

DESCRIPTION OF THE PREFERRED EMBODIMENT

Referring to the drawing, there is schematically illustrated a hydraulic braking system which includes a hydraulic braking pressure generator (hereinafter referred to simply as pressure generator) 10 comprising a hydraulic booster 11 of a well known lever operated type and a so called portless single master cylinder (hereinafter referred to as master cylinder) 12 which are assembled within a common housing. In the housing defined is a power chamber 111 of the hydraulic booster 11, in which a regulator valve 112 and a power piston 113 are disposed.

The power chamber 111 is communicated with an accumulator 31 through a power passage 80 and communicated with a resevoir 70 through a drain passage 86 in which a changeover valve 40 is disposed. The power piston 113 is axially slidably disposed in the power chamber 111 and associated with a plunger 114 which is axially movable within a bore defined in the power piston 113 in response to depression of a brake pedal 20.

The regulator valve 112 comprises a spool valve which is operated by a lever mechanism (not shown) engaged with the power piston 113 and the plunger 114. The reguleter valve 112 is arranged to control the communication of the power chamber 111 with the power passage 80 and the drain passage 86 in response to depression of the brake pedal 20. The power chamber 111 is normally communicated with the reservoir 70 through a passage 115 and the drain passage 86 when the brake pedal 20 is in its initial position, i.e. when it is not depressed.

The accumulator 31 constitutes a power source for generating a hydraulic power pressure along with a fluid pump 33 which is connected to the accumulator 31 via a check valve 34 and connected to the reservoir 70 which stores an amount of hydraulic fluid. The fluid pump 33 is operated by a motor 32 which is actuated by an electric control signal from an electric control device (hereinafter referred to as controller) 50.

The changeover valve 40 is a three ports-two positions solenoid operated directional control valve. A first port of the changeover valve 40 is connected to the reservoir 70, its second port is connected to the pressure generator 10 and its third port is connected to the accumulator 31. The changeover valve 40 is selectively placed in one of a first operating position and a second operating position. In its first operating position or its normal position, the first port and the second port are communicated with each other and the third port is closed, so that the power chamber 111 is communicated with the reservoir 70 via the regulator valve 112 when the brake pedal 20 is not depressed. In the second operating position, the first port is closed and the drain passage 86 is held in communication with the accumulator 31, so that the power chamber 111 is communicated with the accumulator 31 via the regulator valve 112 even when the brake pedal 20 is not depressed. The solenoid of the changeover valve 40 is energized in response to the electric control signal from the controller 50 when the brake pedal 20 is not depressed. In an inoperative condition of the changeover valve 40 (i.e., where its solenoid is not energized), therefore, the changeover valve 40 is placed in the first operating position, whereas in its operative condition (i.e., where its solenoid is energized), it is placed in the second operating position.

Accordingly, in the inoperative condition of the changeover valve 40 when the brake pedal 20 is not depressed, the power chamber 111 is communicated with the reservoir 70 through the passage 115 of the regulator valve 112, the drain passage 86 and the changeover valve 40, so that no hydraulic pressure is generated in the power chamber 111. When the regulator valve 112 is operated by the lever mechanism in response to depression of the brake pedal 20, the regulator valve 111 controls the communication of the power chamber 111 with the power passage 80 and the drain passage 86. Accordingly, the hydraulic power pressure, which is supplied from the accumulator 31 into the power chamber 111 through the power passage 80, is regulated in response to depression of the brake pedal 20, so that a regulated hydraulic pressure is generated in the power chamber 111. In case that the changeover valve 40 is operated and placed in its second operating position when the brake pedal 20 is not depressed, the power chamber 111 is supplied with the hydraulic power pressure from the accumulator 31 through the drain passage 86.

The master cylinder 12 has a master piston 121 which defines a fluid chamber 122 within the housing of the pressure generator 10. The master piston 121 is connected to and moved by the power piston 113. When the plunger 114 is moved and the regulator valve 112 is operated in response to depression of the brake pedal 20, the hydraulic pressure in the power chamber 111, which is regulated into the regulated hydraulic pressure, is applied to the power piston 113, so that the master piston 121 is moved toward the fluid chamber 122. When the hydraulic power pressure from the accumulator 31 is applied to the power chamber 111, the power piston 113 also moves the master piston 121 toward the fluid chamber 122. Accordingly, a hydraulic pressure generated in the fluid chamber 122 corresponds to the hydraulic pressure in the power chamber 111.

The power chamber 111 of the hydraulic booster 11 is communicated with wheel brake cylinders 61 and 62, which are provided on road wheels 1 and 2 respectively, through two ports-two positions solenoid operated valves for supplying the hydraulic pressure (hereinafter referred to simply as supply valves) 41 and 42 respectively. The supply valve 41 is provided together with a check valve 71 in a passage 81 connecting the power chamber 111 to the wheel brake cylinder 61. In its inoperative condition, the power chamber 111 and the wheel brake cylinder 61 are communicated with each other. In its operative condition, the communication between the power chamber 111 and the wheel brake cylinder 61 is blocked. The supply valve 42 is provided together with a check valve 72 in a passage 82 conneting the power chamber 111 with a wheel brake cylinder 62. In its inoperative condition, the power chamber 111 and the wheel brake cylinder 62 are communicated with each other. In its operative condition the communication between the power chamber 111 and the wheel brake cylinder 62 is blocked.

The fluid chamber 122 of the master cylinder 12 is communicated with wheel brake cylinders 63 and 64, which are provided on road wheels 3 and 4 respectively, through supply valves 43 and 44 respectively and an auxiliary changeover valve 49. The supply valve 43 is provided together with a check valve 73 in a passage 83 connecting the auxiliary changeover valve 49 to a wheel brake cylinder 63. In its inoperative condition, the auxiliary changeover valve 49 and the wheel brake cylinder 63 are communicated with each other. In its operative condition, the communication between the auxiliary changeover valve 49 and the wheel brake cylinder 63 is blocked. The supply valve 44 is provided together with a check valve 74 in a passage 84 connecting the auxiliary changeover valve 49 to a wheel brake cylinder 64. In its inoperative condition, the auxiliary changeover valve 49 and the wheel brake cylinder 64 are communicated with each other. In its operative condition, the communication between the auxiliary changeover valve 49 and the wheel brake cylinder 64 is blocked. The supply valves 41 to 44 are operated in response to the electric control signal from the controller 50.

The wheel brake cylinders 61, 62, 63, 64 are connected to the reservoir 70 through two ports-two positions solenoid operated valves for discharging the hydraulic pressure from the wheel brake cylinders (hereinafter referred to as discharge valves) 45, 46, 47, 48 respectively. The discharge valves 45 to 48 are operated in response to the electric control signal from the controller 50. In the operative condition of the discharge valve 45, the wheel brake cylinder 61 and the reservoir 70 are communicated with each other, whereas the communication therebetween is blocked in its inoperative condition, and other discharge valves 46, 47 and 48 function as well.

The auxiliary changeover valve 49 is a three ports-two positions solenoid operated directional control valve arranged to be energized in response to the electric control signal from the controller 50. A first port of the changeover valve 49 is connected to the fluid chamber 122 through a passage 89, its second port is connected to the supply valves 43, 44 and its third port is connected to the power chamber 111. The auxiliary changeover valve 49 is selectively placed in one of a first operating position and a second operating position. In its first operating position or its normal position, the first port and the second port are communicated with each other and the third port is closed, so that the fluid chamber 122 is communicated with the wheel brake cylinders 63, 64 through the supply valves 43, 44 respectively. In the second operating position, the power chamber 111 is communicated with the wheel brake cylinders 63, 64.

The solenoid of the auxiliary changeover valve 49 is controlled to be energized prior to the operation of the discharge valves 47 and 48 operated in the anti-locking operation, which is described later, so that the brake pedal 20 is held in a position at the time of braking during the anti-locking operation, so as to prevent an excessive depression of the brake pedal 20.

In operation, where the brake pedal 20 is depressed in braking operation, the changeover valve 40 is held in its inoperative condition and the hydraulic braking system according to the present embodiment operates as follows:

(A) When the road wheels 1 to 4 are out of particular locking condition, the auxiliary changeover valve 49, the supply valves 41 to 44 and the discharge valves 45 to 48 are in their inoperative condition as shown in the drawing. Accordingly, the hydraulic pressure in the power chamber 111 is regulated in response to depression of the brake pedal 20 into the regulated hydraulic pressure which is applied to the wheel brake cylinders 61, 62, and to the power piston 113. The master cylinder 12 is, therefore, activated to generate from the fluid chamber 122 the hydraulic pressure which is applied to the wheel cylinders 63, 64.

(B) When some of the road wheels 1 to 4 are in the particular locking condition, the auxiliary changeover valve 49 is operated to be placed in its second operating position and then the supply valves 41 to 44 and the discharge valves 45 to 48 are operated by the controller 50 depending on the locking condition, so that the hydraulic pressure in each of the wheel cylinders 61 to 64 is increased or decreased to effectively prevent the road wheels 1 to 4 from locking. Accordingly, the anti-locking operation is achieved.

In the case where the brake pedal 20 is not depressed, the hydraulic braking system operates as follows:

(C) When the changeover valve 40 is in its inoperative condition, the pressure generator 10 is held inoperative, so that no hydraulic pressure is applied to any of the wheel brake cylinders 61 to 64.

(D) When the driven wheels in the road wheels 1 to 4 are in the slip condition in starting or accelerating operation, the changeover valve 40 is operated to be placed in its second operating position and the supply and discharge valves 41 to 48 are operated by the controller 50 depending on the slip condition of the driven wheels, so that only driven wheels are braked without depression of the brake pedal 20, effectively preventing the slip. Accordingly, the anti-slip operation is achieved.

For example, where the road wheels 1 and 2 are rear driven wheels, the anti-slip operation may be obtained by rendering the changeover valve 40 and the supply valves 43 and 44 operative (the discharge valves 47 and 48 as well, if necessary), and operating the discharge valves 45 and 46 (the supply valves 41 and 42 as well, if necessary), in response to the slip condition. Where the wheels 3 and 4 are front driven wheels, the anti-slip operation may be obtained by rendering the changeover valve 40 and the supply valves 41, 42 operative (the discharge valves 45 and 46 as well, if necessary) and operating the discharge valves 47 and 48 (the supply valves 43 and 44 and the auxiliary changeover valve 49 as well, if necessary) in response to the slip condition. Where all the wheels 1 to 4 are driven wheels, it may be obtained by operating the changeover valve 40 and the discharge valves 45 to 48 (the supply valves 41 to 44 and the auxiliary changeover valve 49 as well, if necessary) in response to the slip condition.

Further, when an obstacle is sensed by a sensor (not shown) during the driving of the vehicle, the changeover valve 40 and the supply and discharge valves 41 to 48 (the auxiliary changeover valve 49 as well, if necessary) may be operated suitably by the controller 50 in response to the signal from the sensor, so that a suitable hydraulic braking pressure is applied to all the wheel brake cylinders 61 to 64 to accurately stop the vehicle without depression of the brake pedal 20. That is, an auto-braking operation may be achieved.

As is apparent from the foregoing, with the above-described embodiment of the hydraulic braking system according to the present invention, a hydraulic pressure may be applied to all the wheel brake cylinders 61 to 64 without depression of the brake pedal 20 by operating the changeover valve 40. Therefore, even in case of a vehicle adopting the diagonal dual circuit, or irrespective of the driven wheels as in a front-drive, a rear-drive or all wheels-drive vehicle, the present system may be employed commonly without changing any of the components but by merely suitably modifying the method for controlling the changeover valves 40 and 49 and the valves 41 to 48 by the controller 50.

In the above embodiment, a three ports-two positions solenoid operated directional control valve is adopted as the changeover valve 40 provided in the drain passage 86. However, this changeover valve 40 may be replaced by two sets of two ports-two positions solenoid operated shut-off valves.

Further, in the above embodiment, as a hydraulic braking pressure generator, employed is the hydraulic braking pressure generator 10 comprising the lever operated hydraulic booster 11 and the portless single master cylinder 12 activated by the hydraulic booster 11. However, any hydraulic braking pressure generator (of any type) may be employed, so long as it causes the hydraulic pressure to be generated in the power chamber through control of the hydraulic power pressure supplied from the power source in response to depression of the brake pedal. Further, it is possible to employ a sole hydraulic pressure booster or a combination of a tandem master cylinder and the hydraulic pressure booster.

In the above embodiment, the power source having the accumulator 31, the motor 32, the fluid pump 33 and the check valve 34 is adopted as the power source. However, it is possible to embody the present invention by adopting other hydraulic power pressure sources.

Further, in the above embodiment the supply valves 41 to 44 and the discharge valves 45 to 48 are adopted as the valve means for controlling the communication between each wheel brake cylinder of 61 to 64 and the hydraulic braking pressure generator 10 and the communication between each wheel brake cylinder and the reservoir 70 connected thereto. However, it is possible, instead, to use a three ports-two positions solenoid operated directional control valve in each wheel brake cylinder.

Although in the above embodiment the auxiliary changeover valve 49 is provided between the master cylinder 12 and both the wheel brake cylinders 63 and 64, it is possible to embody the system without the auxiliary changeover valve 49.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system for an automotive vehicle comprising:
 a power source for producing a hydraulic power pressure;
 a reservoir for storing an amount of hydraulic fluid;
 a hydraulic braking pressure generator having a housing defining therein a power chamber communicated with said power source through a power passage and communicated with said reservoir through a drain passage, said hydraulic braking pressure generator being arranged to control the communication of said power chamber with said power source and said reservoir in response to depression of a brake pedal to generate a hydraulic pressure in said power chamber, said power chamber normally communicating with said reservoir through said drain passage when said brake pedal is in an initial position thereof, said hydraulic braking pressure generator includes a regulator valve disposed within said power chamber and connected to said power passage and said drain passage, said regulator valve being arranged to control the communication of said power chamber with said power passage and said drain passage in response to depression of said brake pedal to regulate said hydraulic power pressure supplied from said power source and generate a regulated hydraulic pressure in said power chamber, said power chamber normally communicating with said drain passage when said brake pedal is an initial position thereof, said hydraulic braking pressure generator further including a master piston defining a fluid chamber in said housing and a power piston associated with said master piston, said power piston being applied with the hydraulic pressure in said power chamber, and said wheel brake cylinders are divided into a first group of wheel brake cylinders communicated with said fluid chamber and a second group of wheel brake cylinders communicated with said power chamber;
 a changeover valve selectively placed in one of a first operating position for communicating said power chamber with said reservoir through said drain passage, and a second operating position for communicating said power chamber with said power source through said drain passage and blocking the communication between said power chamber and said reservoir;
 a plurality of wheel brake cylinders for braking respective road wheels, said wheel brake cylinders being connected to said hydraulic braking pressure generator to be applied with a hydraulic pressure corresponding to the hydraulic pressure generated in said power chamber and said wheel brake cylinders being connected to said reservoir;

an auxiliary changeover valve is positioned in a fluid passage connecting said fluid chamber and said first group of wheel brake cylinders, said auxiliary changeover valve normally communicates said fluid chamber with said first group of wheel brake cylinders, and said auxiliary changeover valve blocks the communication therebetween and communicates said power chamber with said first group of wheel brake cylinders when said auxiliary changeover valve is operated, wherein said auxiliary changeover valve further includes a three port-two position solenoid operated directional control valve having a first auxiliary port connected to said fluid chamber, a second auxiliary port connected to said first group of wheel brake cylinders and a third auxiliary port connected to said power chamber, said first auxiliary port and said second auxiliary port are normally communicated therebetween and said third auxiliary port is normally closed, said second auxiliary port and said third auxiliary port are communicated therebetween and said first auxiliary port is closed when said auxiliary changeover valve is energized; and valve means for controlling the communication between said hydraulic braking pressure generator and said wheel brake cylinders, and the communication between said reservoir and said wheel brake cylinders.

2. A hydraulic braking system for an automotive vehicle of claim 1, wherein said hydraulic braking pressure generator includes a regulator valve disposed within said power chamber and connected to said power passage and said drain passage, said regulator valve being arranged to control the communication of said power chamber with said power passage and said drain passage in response to depression of said brake pedal to regulate said hydraulic power pressure supplied from said power source and generate a regulated hydraulic pressure in said power chamber, said power chamber normally communicating with said drain passage when said brake pedal is in an initial position thereof.

3. A hydraulic braking system for an automotive vehicle of claim 1, wherein said auxiliary changeover valve is arranged to be operated before said valve means is operative.

4. A hydraulic braking system for an automotive vehicle comprising:

a power source for producing a hydraulic power pressure;

a reservoir for storing an amount of hydraulic fluid;

a hydraulic braking pressure generator having a housing defining therein a power chamber communicated with said power source through a power passage and communicated with said reservoir through a drain passage, said hydraulic braking pressure generator being arranged to control the communication of said power chamber with said power source and said reservoir in response to depression of a brake pedal to generate a hydraulic pressure in said power chamber, said power chamber normally communicating with said reservoir through said drain passage when said brake pedal is in an initial position thereof, wherein said hydraulic braking pressure generator includes a regulator valve disposed within said power chamber and connected to said power passage and said drain passage, said regulator valve being arranged to control the communication of said power chamber with said power passage and said drain passage in response to depression of said brake pedal to regulate said hydraulic power pressure supplied from said power source and generate a regulated hydraulic pressure in said power chamber, said power chamber normally communicating with said drain passage when said brake pedal is an initial position thereof, said hydraulic braking pressure generator further includes a master piston defining a fluid chamber in said housing and a power piston associated with said master piston, said power piston being applied with the hydraulic pressure in said power chamber, said wheel brake cylinders are divided into a first group of wheel brake cylinders communicated with said fluid chamber and a second group of wheel brake cylinders communicated with said power chamber, a changeover valve selectively placed in one of a first operating position for communicating said power chamber with said reservoir through said drain passage, and a second operating position for communicating said power chamber with said power source through said drain passage and blocking the communication between said power chamber and said reservoir;

a plurality of wheel brake cylinders for braking respective road wheels, said wheel brake cylinders being connected to said hydraulic braking pressure generator to be applied with a hydraulic pressure corresponding to the hydraulic pressure generated in said power chamber and said wheel brake cylinders being connected to said reservoir; and valve means for controlling the communication between said hydraulic braking pressure generator and said wheel brake cylinders, and the communication between said reservoir and said wheel brake cylinders.

5. A hydraulic braking system for an automotive vehicle of claim 4, wherein an auxiliary changeover valve is disposed in a fluid passage connecting said fluid chamber and said first group of wheel brake cylinders, and wherein said auxiliary changeover valve normally communicates said fluid chamber with said first group of wheel brake cylinders, whereas said auxiliary changeover valve blocks the communication therebetween and communicates said power chamber with said first group of wheel brake cylinders when said auxiliary changeover valve is operated.

6. A hydraulic braking system for an automotive vehicle of claim 5, wherein said auxiliary changeover valve comprises a three ports-two positions solenoid operated directional control valve having a first auxiliary port connected to said fluid chamber, a second auxiliary port connected to said first group of wheel brake cylinders and a third auxiliary port connected to said power chamber, and wherein said first auxiliary port and said second auxiliary port are normally communicated therebetween and said third auxiliary port is normally closed, whereas said second auxiliary port and said third auxiliary port are communicated therebetween and said first auxiliary port is closed when said auxiliary changeover valve is energized.

* * * * *